United States Patent [19]
Cho et al.

[11] Patent Number: 5,631,508
[45] Date of Patent: May 20, 1997

[54] COST-SAVING, SMALL-SIZED MOTOR WITH IMPROVED STABILITY OVER WIDE SPEED RANGE

[75] Inventors: Yasuhisa Cho, Hiratsuka; Hiroshi Okusa, Isehara, both of Japan

[73] Assignee: Mitsumi Electric Co., Ltd., Tokyo, Japan

[21] Appl. No.: 279,994

[22] Filed: Jul. 25, 1994

[30] Foreign Application Priority Data

Jul. 27, 1993 [JP] Japan .................. 5-040814

[51] Int. Cl.⁶ .................. H02K 11/00; H02K 1/22; H02K 21/24
[52] U.S. Cl. .................. 310/68 B; 310/156; 310/268
[58] Field of Search .................. 310/268, 156, 310/68 B; 324/207.11, 207.22, 207.23, 207.25

[56] References Cited

U.S. PATENT DOCUMENTS

| | | | |
|---|---|---|---|
| 4,211,963 | 7/1980 | Miller | 310/268 |
| 4,260,920 | 4/1981 | Nakamura et al. | 310/156 |
| 4,329,636 | 5/1982 | Uchida et al. | 310/68 R |
| 4,481,440 | 11/1984 | Muller | 310/268 |
| 4,574,211 | 3/1986 | Muller et al. | 310/68 R |
| 4,701,650 | 10/1987 | Maemine | 310/68 R |
| 4,717,850 | 1/1988 | Muller | 310/156 |
| 4,737,675 | 4/1988 | Maemine et al. | 310/268 |
| 4,755,701 | 7/1988 | Shikama | 310/156 |
| 4,801,830 | 1/1989 | Ogino et al. | 310/688 |
| 4,902,923 | 2/1990 | Okauchi | 310/268 |
| 4,968,913 | 11/1990 | Sakamoto | 310/156 |

*Primary Examiner*—Clayton E. LaBalle
*Attorney, Agent, or Firm*—Frishauf, Holtz, Goodman, Langer & Chick

[57] ABSTRACT

A motor including a rotor member having a symmetric shape relative to a shaft to which the rotor member is being fixed. An annular magnet assembly is fixed to the rotor member with the shaft passed therethrough at a center thereof. The magnet assembly is provided with an even number of driving magnetized elements of north and south poles alternatively aligned at a perimeter of the magnet assembly. First sensed magnetized elements are provided in the driving magnetized elements in an opposite pole relation with the corresponding driving magnetized element, and second sensed magnetized elements provided in two adjacent ones of the driving magnetized elements in an opposite pole relation with the corresponding driving magnetized element. The motor further includes a magnetic field sensor assembly opposed to the magnet assembly for sensing alternating magnetic fields as the rotor member rotates.

22 Claims, 7 Drawing Sheets

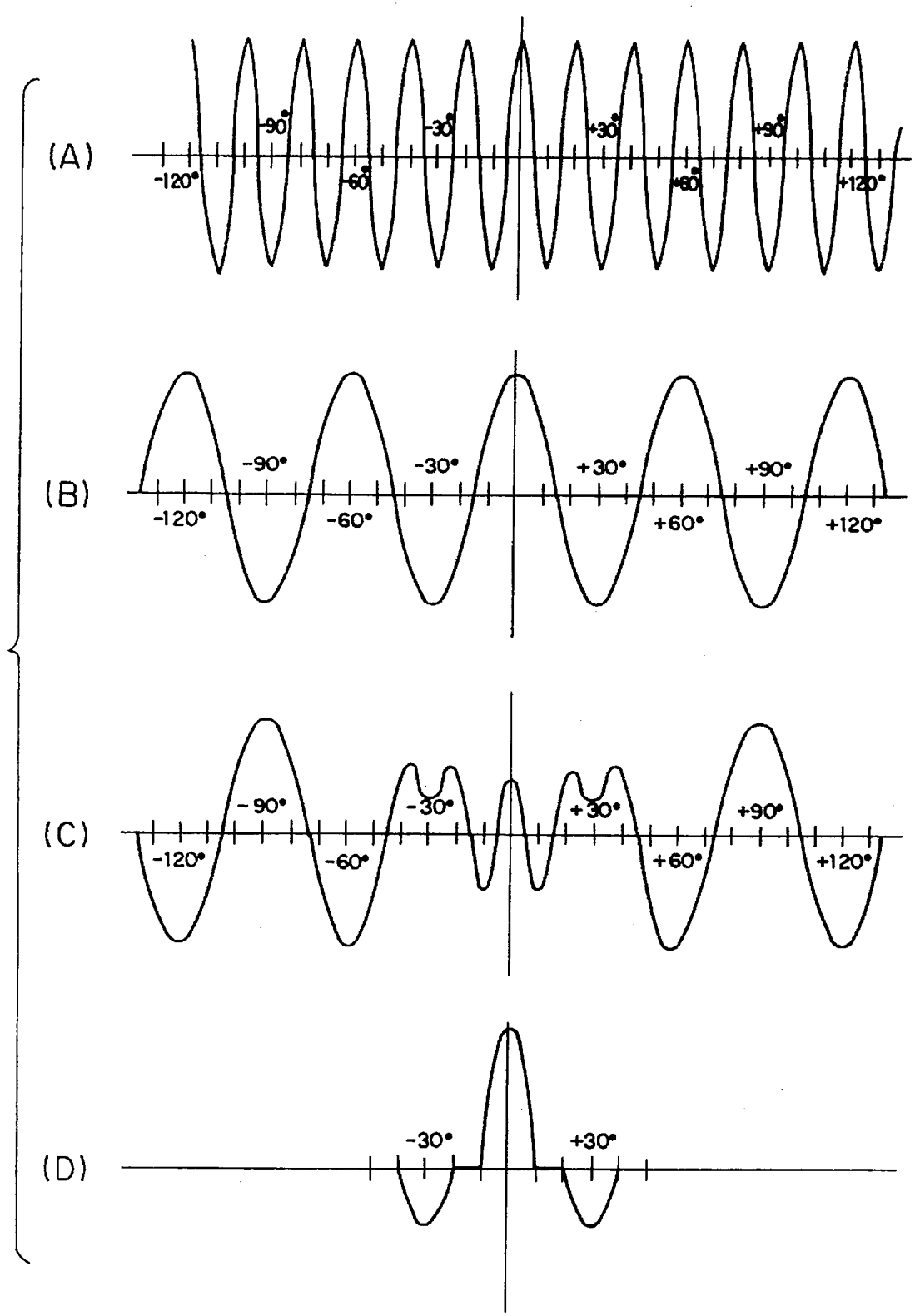
F I G. 7

COST-SAVING, SMALL-SIZED MOTOR WITH IMPROVED STABILITY OVER WIDE SPEED RANGE

BACKGROUND OF THE INVENTION

The present invention relates to a motor of which rotation speed and rotary phase can be adjusted.

Motors have been used for many applications in our daily life. While characteristics of a motor depend on the particular application of the motor, stability of a rotation speed and a rotary phase typically affects properties of the motor. For example, motors used to drive a magnetic head of video tape recorders or rotary digital audio tape recorders should be capable of being rotated at a constant speed. This is because an inferior rotary characteristic of the motor causes a reproduced signal to be changed such that reproduced images or sounds are caused to fluctuate.

The motor of the type described above typically comprises a shaft rotatably supported by a supporting member, first and second rotor members, and first and second stator members. The first and second rotor members are secured to the shaft and are opposed to the first and second stator members, respectively. The first rotor member has a driving magnet assembly attached thereto. The driving magnet assembly comprises an even number of driving magnetized elements. The driving magnetized elements are aligned on a perimeter or circumference of the first rotor member about the shaft such that one driving magnetized element has a pole opposite the pole of the neighboring ones. In other words, the driving magnet assembly has alternating poles. The first stator member has an armature which comprises armature coils opposed to the driving magnetized elements such that a predetermined gap is formed between the armature coils and the driving magnet assembly. An alternating current across the armature coils produces induction field, which generates an attractive (opposing) force between the driving magnetized elements and the armature coils. This force causes the first rotor member to rotate.

The second rotor member has a sensed magnet assembly attached thereto. The sensed magnet assembly comprises an even number of sensed magnetized elements. The sensed magnetized elements are aligned on a perimeter or circumference of the second rotor member about the shaft such that one sensed magnetized element has a pole opposite the pole of the neighboring ones. The second stator member has a magnetic field sensor opposed to the sensed magnet assembly such that a predetermined gap is formed between the magnetic field sensor and the sensed magnet assembly. The magnetic field sensor comprises a plurality of sensing elements for sensing the alternating magnetic field with rotation of the second rotor member. The magnetic field causes an induced electromotive force to be generated. This induced electromotive force is used to produce a sensor signal corresponding to the rotation of the rotor members and then determine the rotation speed and/or the rotary phase of the motor.

As apparent from the above, the conventional motor has separate magnet assemblies for driving as well as for sensing. This increases the number of components or parts of the motor assembled through complicated steps. Such motor can be produced only at a relatively large production cost. In addition, these two magnet assemblies limit available reduction in size of the motor itself. Further, the number of the sensing elements is relatively small due to economical considerations. It is thus difficult to distinguish the sensor signal from a noise when the rotor members rotate at a low speed. More specifically, the induced electromotive force has a waveform of relatively small amplitude due to the low number of the sensing elements especially in rotation at a low speed. This makes it hard to distinguish the sensor signal from noise.

SUMMARY OF THE INVENTION

Accordingly, an object of the present invention is to provide a cost-saving motor of as small a size as possible without affecting the accuracy of sensor signals on the rotation speed and the rotary phase.

Another object of the present invention is to provide a motor produced at a smaller production cost with less number of parts assembled through simple steps.

Another object of the present invention is to provide a motor adapted to be reduced in size.

It is yet another object of the present invention to provide a motor of which rotation speed and rotary phase can be stabilized even in rotation at a low speed.

According to a first aspect of the present invention, there is provided a motor comprising a shaft rotatably supported by a supporting member; a rotor member fixed to the shaft; a magnet assembly comprising a plurality of driving magnetized elements which are circumferentially aligned with each other such that two adjacent ones of the driving magnetized elements have different poles from each other, the magnet assembly being fixed to the rotor member; an armature having armature coils which are opposed to the magnet assembly and which are for use in generating induction magnetic field to rotate the rotor member by interaction between the magnetic fields generated by the armature coils and the magnet assembly; and magnetic field sensing means disposed between the armature coil and the magnet assembly; the magnet assembly further comprising: a plurality of sensed magnetized elements which are circumferentially aligned with each other such that two adjacent ones of the sensed magnetized elements and the driving magnetized elements have different poles from each other, and the magnetic field sensing means being formed of a magnetic field sensor for sensing, as the rotor member rotates, the magnetic fields generated by the driving magnetized elements and the sensed magnetized elements.

According to a second aspect of the present invention, there is provided a motor comprising: a shaft rotatably supported by a supporting member; a rotor member fixed to the shaft; a magnet assembly comprising a plurality of driving magnetized elements which are circumferentially aligned with each other such that two adjacent ones of the driving magnetized elements have different poles from each other, the magnet assembly being fixed to the rotor member; an armature having armature coils which are opposed to the magnet assembly and which are for use in generating induction magnetic fields to rotate the rotor member by interaction between the magnetic fields generated by the armature coils and the magnet assembly; and magnetic field sensing means disposed between the armature coils and the magnet assembly; the magnet assembly further comprising: a plurality of first sensed magnetized elements which are circumferentially aligned with each other such that two adjacent ones of the first sensed magnetized elements and the driving magnetized elements have different poles from each other; and two second sensed magnetized elements, the first sensed magnetized elements being of a different pole from the corresponding driving magnetized elements, the second sensed magnetized elements being formed in two adjacent ones of the driving magnetized elements, each of the second sensed magnetized elements being of a different pole from the corresponding driving magnetized element in which it is disposed and being radially displaced from the corresponding first sensed magnetized element, the magnetic field sensing means comprising: a first magnetic field sensor for sensing, as the rotor member rotates, the magnetic fields generated around the driving and first sensed magnetized elements; and a second magnetic field sensor, for sensing, as the rotor member rotates, the magnetic fields generated around the driving and second sensed magnetized elements.

BRIEF DESCRIPTION OF THE DRAWING

The foregoing features of the present invention may be more fully understood from the following detailed description presented hereinbelow in conjunction with the accompanying drawing, in which:

FIG. 7 is a view showing waveforms of sensor signals obtained by the first and the second magnetic field sensors shown in FIG. 4;

DESCRIPTION OF THE PREFERRED EMBODIMENTS

Figure 1:
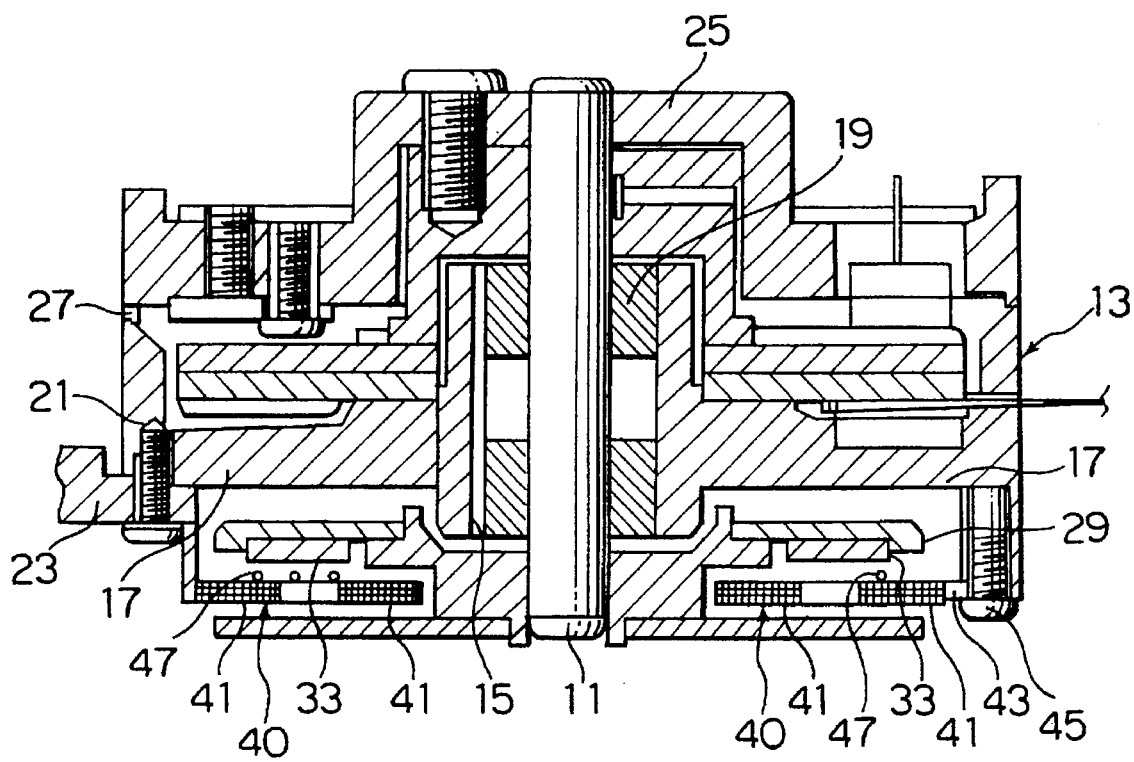
FIG. 1 is a sectional view of a motor according to a first embodiment of the present invention.

A motor according to a first embodiment of the present invention is described with reference to FIGS. 1 through 7. Throughout the following detailed description like reference numerals represents like elements.

As shown in FIG. 1, a motor of the present invention comprises a shaft 11 rotatably supported by a supporting member 13. The supporting member 13 has a supporting bracket 17 and bearings 19. The supporting bracket 17 has an inner peripheral surface 15 defining a bore through which the shaft 11 is passed. The bearings 19 are arranged between the inner peripheral surface 15 and the shaft 11 to support the latter in a rotatable manner. The supporting bracket 17 is secured with a screw 21 to a stator member 23. A first rotor member 25 is fixedly attached to the shaft 11. A magnetic head 27 is secured to an outer periphery of the first rotor member 25. The magnetic head 27 performs one or more functions of reading, writing, and erasing data on a magnetic recording medium which is not shown.

Figure 2:
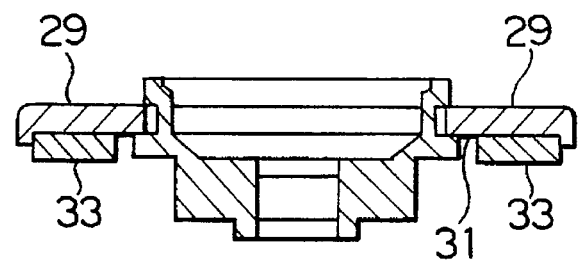
FIG. 2 is a sectional view showing a rotor member and a magnet assembly of the motor in FIG. 1.

A second rotor member 29 is also fixedly attached to the shaft 11. The second rotor member 29 has a lower surface 31, as best shown in FIG. 2, to which a magnet assembly 33 is secured. The magnet assembly 33 is opposed to armature coils 41 of an armature 40. The armature coils 41 are supported by a coil supporting plate 43 with a predetermined distance left between the armature coils 41 and the magnet assembly 33. The coil supporting plate 43 is fixed to the supporting bracket 17 with a screw 45. An alternating current flow through the armature coils 41 produces an induction field, which generates an attractive (opposing) force between the magnet assembly 33 and the armature coils 41. This force causes the second rotor member 29 to rotate. The shaft 11 is thus revolved in response to the rotation of the second rotor member 29. As the shaft 11 is revolved, the first rotor member 25 is rotated and, in turn, the magnetic head 27 is rotated. A magnetic field sensor assembly 47 is disposed between the armature coil 41 and the magnet assembly 33. Details of the magnetic field sensor assembly 47 will be described later.

Figure 3:
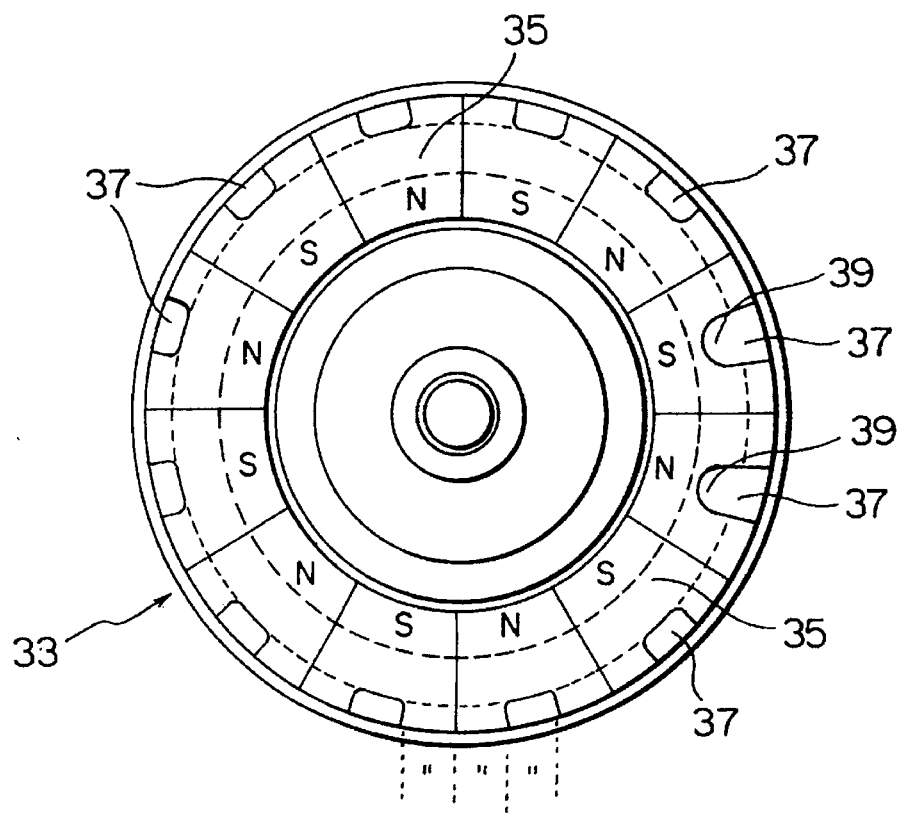
FIG. 3 is a bottom plan view of a magnet assembly according to the first embodiment of the present invention.

Referring to FIG. 3, details of the magnet assembly 33 are described. The magnet assembly 33 comprises driving magnetized elements 35, first sensed magnetized elements 37, and second sensed magnetized elements 39. In the embodiment shown in FIG. 3, twelve driving magnetized elements 35 are used by way of illustration. However, the present invention is not limited to this number and a different even number of elements may also be used. As shown in FIG. 3, the driving magnetized elements 35 are aligned annularly such that one driving magnetized element has a pole opposite the pole of the neighboring ones. The first sensed magnetized elements 37 are evenly spaced at the perimeter end of the magnet assembly 33. The first sensed magnetized elements 37 have poles opposite the pole of the corresponding driving magnetized elements 35. In addition, a perimeter width (i.e., a length in a direction perpendicular to the radial direction) of each first sensed magnetized element 37 is equal to ⅓ of the width of the driving magnetized element 35. The first sensed magnetized elements 37 are located at a circumferential center of the respective driving magnetized elements 35. For the driving magnetized element 35 of the north pole, one third is of the north pole (N). A second third corresponding to the first sensed magnetized element 37 is of the south pole (S), and the last third of the driving magnetized element 35 is of the north pole (N). As a result, thirty-six N and S alternating regions (hereinafter, referred to as magnetized segments) of the same width are aligned at the perimeter end of the magnet assembly 33. The second sensed magnetized elements 39 are formed in any adjacent two driving magnetized elements 35. As in the first sensed magnetized elements 37, the second sensed magnetized elements 39 have poles opposite the pole of the corresponding driving magnetized elements 35. Each second sensed magnetized element 39 is radially inward from the corresponding first sensed magnetized element 37. While the second sensed magnetized elements 39 are integral with the respective first sensed magnetized elements 37, it should be understood that the first and second sensed magnetized elements may be separated from each other. Each of the driving and sensed magnetized elements may be formed of permanent magnet or an equivalent. For example, the magnetized elements may be formed of a disc which may be made of magnetic material and may be magnetized through a known adequate method.

Figure 4:
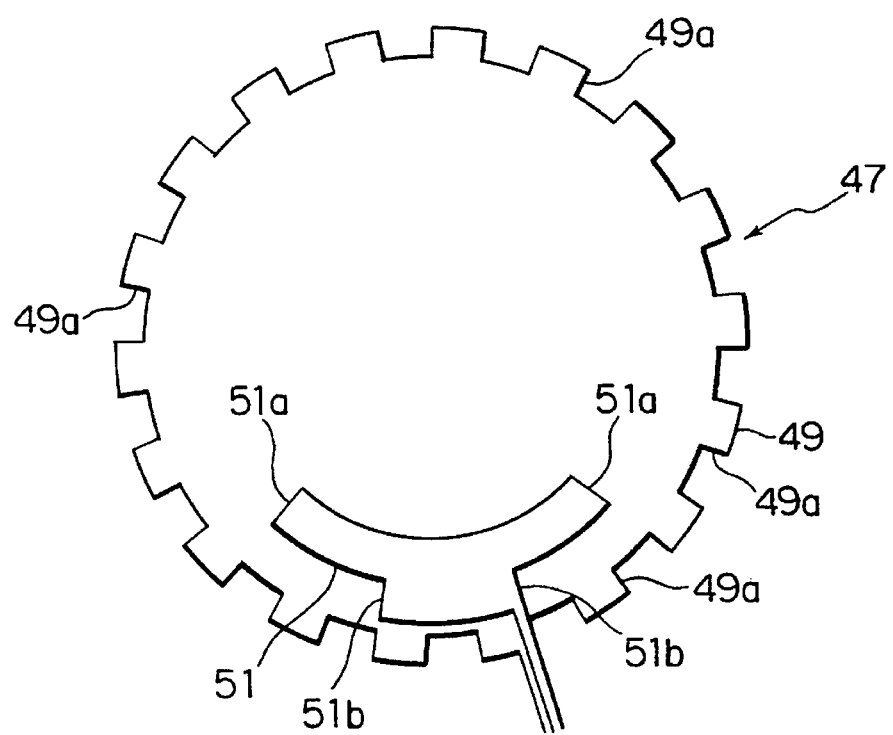
FIG. 4 is a plan view showing first and second magnetic field sensors according to the first embodiment of the present invention.

Referring to FIG. 4 along with FIG. 3, details of the magnetic field sensor assembly 47 are described. The magnetic field sensor assembly 47 comprises a first magnetic field sensor 49 and a second magnetic field sensor 51. The first magnetic field sensor 49 is formed of a wire-shaped conductive member such as a copper wire for sensing a magnetic field generated in a region defined by an outer periphery of the magnet 33 and a circle represented by a dotted line in FIG. 3. This region is hereinafter referred to as a magnetized segment zone. Likewise, the second magnetic field sensor 51 is formed of a wire-shaped conductive member for sensing magnetic fields generated in a region defined by an inner periphery of the driving magnetized elements 35 and a circle represented by a dot-dash line in FIG. 3 (hereinafter referred to as an inner zone) as well as magnetic fields generated in a region defined by the dot-dash line and the dotted line (hereinafter referred to as an intermediate zone).

The first magnetic field sensor 49 may be formed of, for example, a generally circular wire which has projected portions extending radially outward as shown in FIG. 4. In this event, each of the projected portions has a width corresponding to the first sensed magnetized element 37. A distance or a gap between the projected portions is also equal to the width of the first sensed magnetized element 37. In other words, the first magnetic field sensor 49 consists of eighteen projected portions and eighteen indented portions, each corresponding to the thirty-six magnetized segments. The first magnetic field sensor 49 comprises a plurality of first induced portions 49a extending radially. The first magnetic field sensor 49 senses magnetic fields generated in the magnetized segment zone to produce a first sensor signal.

To facilitate understanding of the present invention, a principle of the magnetic field sensing by the sensor 49 is described with reference to FIG. 5. The first induced portion 49a passes through the magnetic fields or magnetic fluxes H leaving or entering each magnetized segment as the second rotor member rotates. As a result, an electromotive force e is induced at the first induced portion 49a via the Fleming's right hand rule. The magnetic fluxes are generated around the entire surface of the driving magnetized elements 35 and the sensed magnetized elements 37 and 39. The magnetic field sensor according to the present invention uses, to obtain a sensor signal, the induced electromotive force resulting from the motion of the first induced portions 49a through the magnetic fluxes. The first magnetic field sensor 49 is connected to terminals (not shown) at both ends thereof. As well known in the art, a direction of the induced electromotive force generated at the first induced portion 49a changes as it passes the alternating magnetic fluxes which have alternating directions.

A relation between the first induced portion 49a and the sensor signal is now described with reference to FIG. 6. The induced electromotive force obtained as a sensor signal of the first magnetic field sensor 49 corresponds to a sum of the induced electromotive forces generated at the individual induced portions 49a. However, only one first induced portion 49a is directed for illustration below. In the figure, a time instant t1 represents when the first induced portion 49a comes to the driving magnetized element 35 of the south pole. At that position, the magnetic fluxes leaving and entering the driving magnetized elements 35 of north and south poles, respectively, is approximately parallel to the surface of the magnetic assembly. Accordingly, no electromotive force is induced at the first induced portion 49a. At a time instant t2, the first induced portion 49a passes perpendicularly through the magnetic fluxes entering the magnetized segment of the south pole. As a result, a direction of the induced electromotive force is changed at that instant. The second rotor member further rotates, and the first induced portion 49a passes through the magnetic fluxes leaving the magnetized segment (sensed magnetized element 37) of the north pole. At that time, the direction of the induced electromotive force is again changed. In this event, an amount of movement (rotary phase) of the first induced portion 49a from t2 to t3, or from t3 to t4 corresponds to a pole pitch P of the magnetized segment. In other words, the pole pitch P is equal to an angle obtained by means of dividing 360° by the number of the magnetized segments. As mentioned above, the first induced portion 49a passes through the magnetic fluxes each of which is caused by N, S, and again N. A single period of the waveform is equal to a double of the pole pitch P. In this embodiment, the number of the magnetized segments is equal to thirty-six. Accordingly, the sensor signal obtained through the first magnetic field sensor 49 has a period of 20° as shown in FIG. 7(A). With the conventional magnetic field sensor, a sensor signal has a period of 60° for example. The present invention can thus be used advantageously to obtain a rotary phase for adjustment with a higher accuracy. In addition, the strength of the induced electromotive force obtained by using the first magnetic field sensor 49 is in proportion to the sum of the electromotive forces induced at each induced portions 49a. Accordingly, an amplitude of the waveform of the resultant sensor signal is increased with the increased number of the first induced portions 49a. In this embodiment, the induced electromotive force obtained across the terminals corresponds to the sum of the electromotive forces induced at the thirty-six induced portions 49a. As a result, the sensor signal obtained through the first magnetic field sensor 49 has a waveform of a larger amplitude than that obtained through the conventional magnetic field sensor. This makes it easier to distinguish the sensor signal from noises during rotation of the motor at a low speed as compared with a case where the conventional magnetic field sensor is used. While only the waveform in the range from −120° to +120° is illustrated in FIG. 7(A), it can be understood that the output signal has a sinusoidal waveform with eighteen cycles by every one of rotation of the magnet assembly 33.

Turning back to FIG. 4, the second magnetic field sensor 51 is described. As mentioned above, the second magnetic field sensor 51 is formed of the wire-shaped conductive member. The second magnetic field sensor 51 consists of, for example, four arc-shaped portions, second induced portions 51a, and third induced portions 51b as shown in FIG. 4. The second induced portions 51a are for sensing magnetic fields or magnetic fluxes generated in the inner zone. The second induced portions 51a are away from each other at a distance equal to the width of three driving magnetized elements. On the other hand, the third induced portions 51b are for sensing magnetic fields or magnetic fluxes generated in the intermediate zone. The third induced portions 51b are away from each other at a distance equal to the width of one driving magnetized element. In addition, the second and the third induced portions 51a and 51b are equally away from each other at a distance corresponding to the width of the driving magnetized element 35. As in the case of the first induced portions 49a, the second induced portions 51a pass through magnetic fluxes generated at the inner zone while the third induced portions 51b pass through magnetic fluxes generated at the intermediate zone. This causes the electromotive force to be induced at both ends of the second and the third induced portions 51a and 51b. As in the case of the first magnetic field sensor 49, the second magnetic field sensor 51 is connected to terminals (not shown) at both end thereof.

Figure 5:
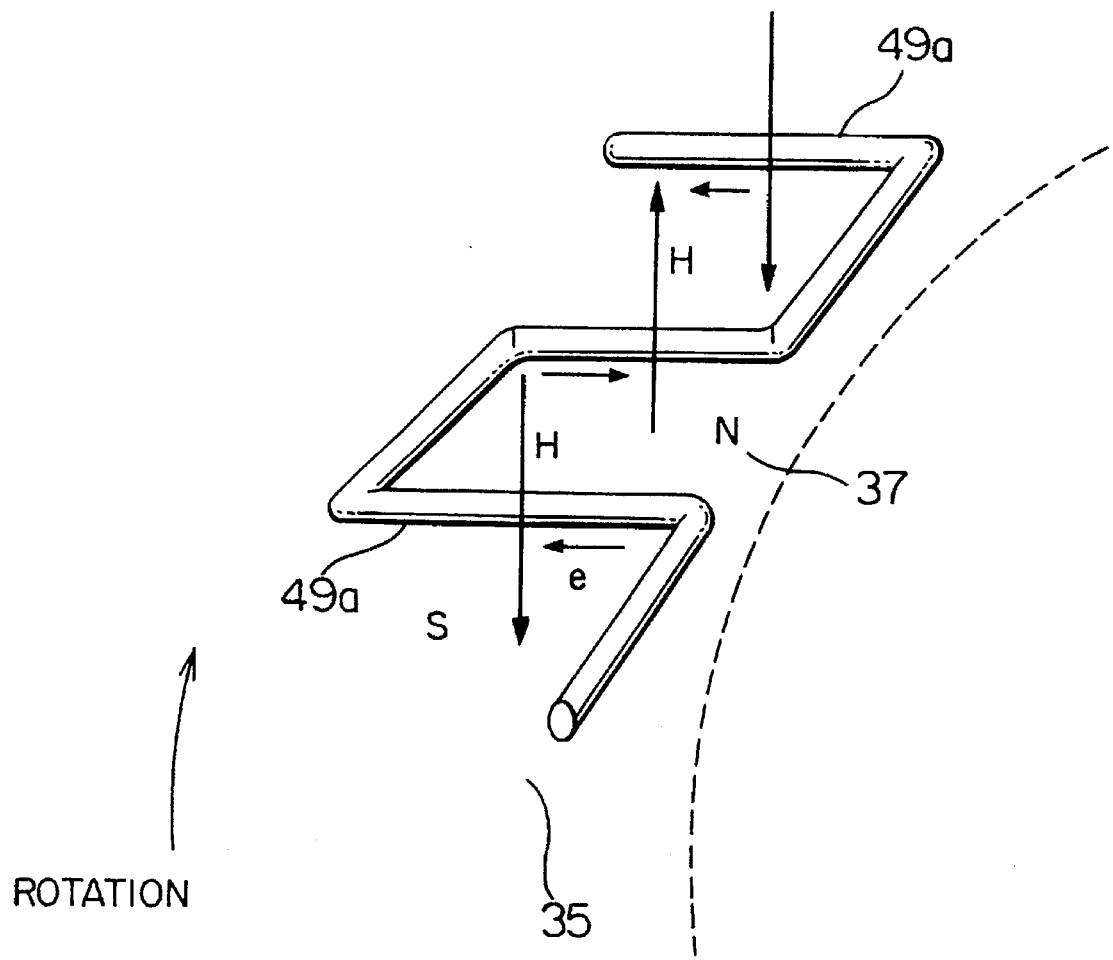
FIG. 5 is a view illustrating relation among the first magnetic field sensor, a magnetic field, and an electromotive force.
Figure 6:
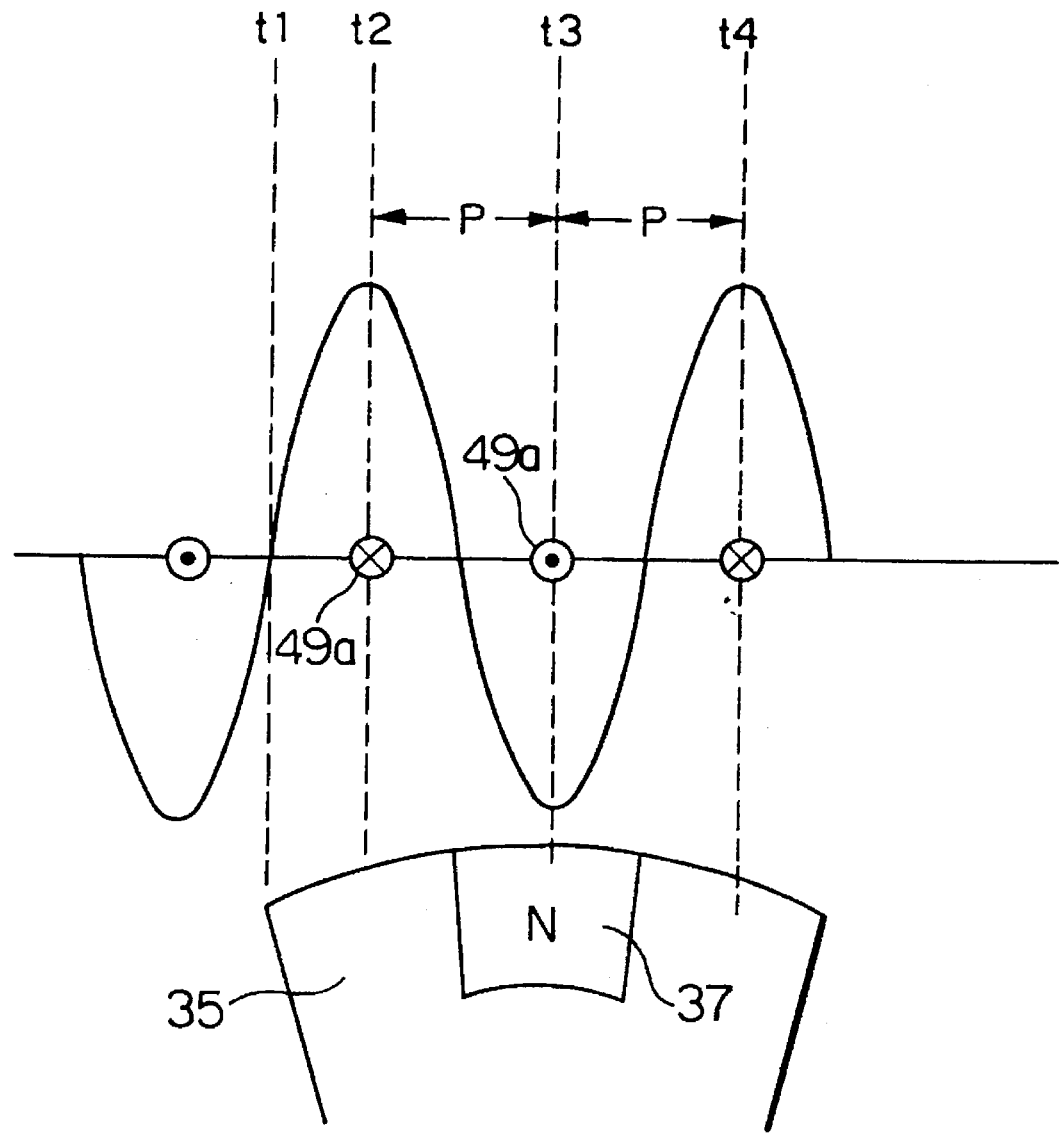
FIG. 6 is a view for use in describing a principle of operation of the magnetic field sensors according to the present invention.

The principle of induction of the electromotive force in the second and the third induced portions 51a and 51b is similar to that in the first induced portion 49a described in conjunction with FIGS. 5 and 6. Accordingly, detailed description thereof will be omitted.

In this embodiment, the number of the driving magnetized elements 35 is equal to twelve, so that the pole pitch P is equal to 30° when considering only the second induced portion 51a. A sensor signal obtained across the second induced portion 51a thus has a period of 60° as shown in FIG. 7(B). On the other hand, the third induced portion 51b produces a sensor signal which is 180° angular separation from the waveform obtained at the second induced portion 51a unless it comes to the second sensed magnetized element 39. The pole pitch for the third induced portion 51b is equal to 10° when it passes the magnetic fluxes generated at the second sensed magnetized element 39. This disturbs the waveform of the sensor signal obtained through the third induced portion 51b as it passes the second sensed magnetized element 39. As a result, the waveform is as shown in FIG. 7(C). Considering separately the second and the third induced portions, the waveforms obtained are as shown in FIGS. 7(B) and 7(C). A second sensor signal of the second magnetic field sensor 51 obtained across the terminals connected thereto is a synthesized product of the induced electromotive forces generates at the second and the third induced portions 51a and 51b. FIG. 7(D) shows a waveform of the resultant sensor signal obtained after synthesis. As shown in FIG. 7(D), the waveforms obtained through the second and the third induced portions 51a and 51b are 180° out of phase and so cancel one another when added except for the disturbed section between −40° and +40°. Accordingly, synthesis of these waveform causes compensation of the remaining waveform sections. The resultant signal thus has only the disturbed section of the waveform extracted as a result of the synthesis which the disturbed section is generated when the third induced portion 51b passes across the magnetic fluxes at the second sensed magnetized element 39. This enhanced peak shown in FIG. 7(D) is obtained once at single rotation of the magnet assembly 33. As a result, it is possible to determine the rotation speed of the motor readily and positively only by means of counting the number of peaks.

Figure 8:
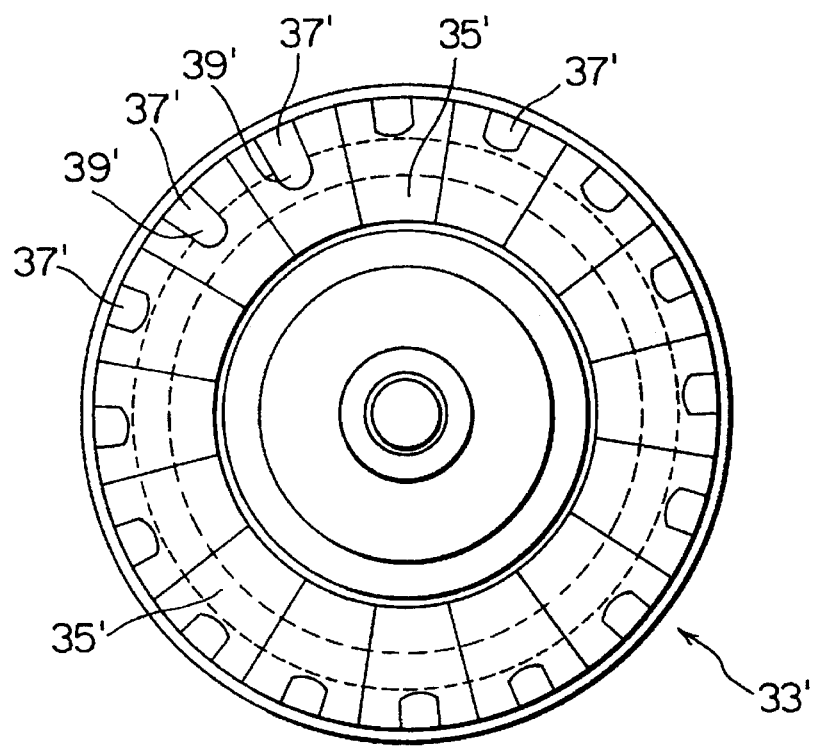
FIG. 8 is a bottom plan view of a magnet assembly of the motor according to a second embodiment of the present invention.
Figure 9:
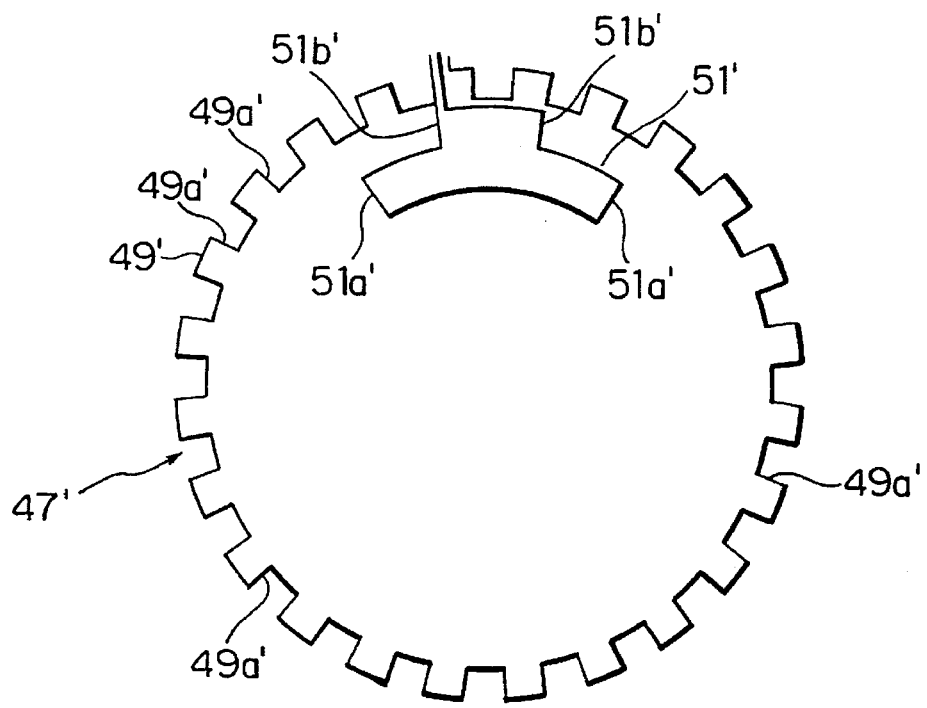
FIG. 9 is a plan view showing first and second magnetic field sensors for sensing the rotation speed of the motor according to the second embodiment of the present invention.

Next, a second embodiment of the present invention is described with reference to FIGS. 8 and 9. In this second embodiment, a magnet assembly 33' in FIG. 8 and a magnetic field sensor assembly 47' in FIG. 9 are applied to the same motor as the one described in conjunction with FIG. 1 in the first embodiment. The magnet and magnetic field sensor assemblies 33' and 47' are similar in function to those described in the first embodiment. Accordingly, detailed description thereof will be omitted. The magnet assembly 33' comprises sixteen driving magnetized elements 35'. On the other hand, a first magnetic field sensor 49' consists of twenty-four projected portions and twenty-four indented portions, each corresponding to forty-eight magnetized segments. Since the number of the magnetized segments is equal to forty-eight, a sensor signal obtained through the first magnetic field sensor 49' has a period of 15°. In addition, the sensor signal obtained through the second induced portion 51a in the first embodiment has the period of 60°. On the contrary, a sensor signal obtained through a second induced portion 51a' has a period of 45° because the number of the driving magnetized elements is equal to sixteen. A similar waveform with the 45-degree periods can be obtained at a third induced portion 51b'. A sensor signal of the entire second magnetic field sensor 51' has a waveform corresponding to an extraction of the disturbed section generated from −30° to +30°.

Figure 10:
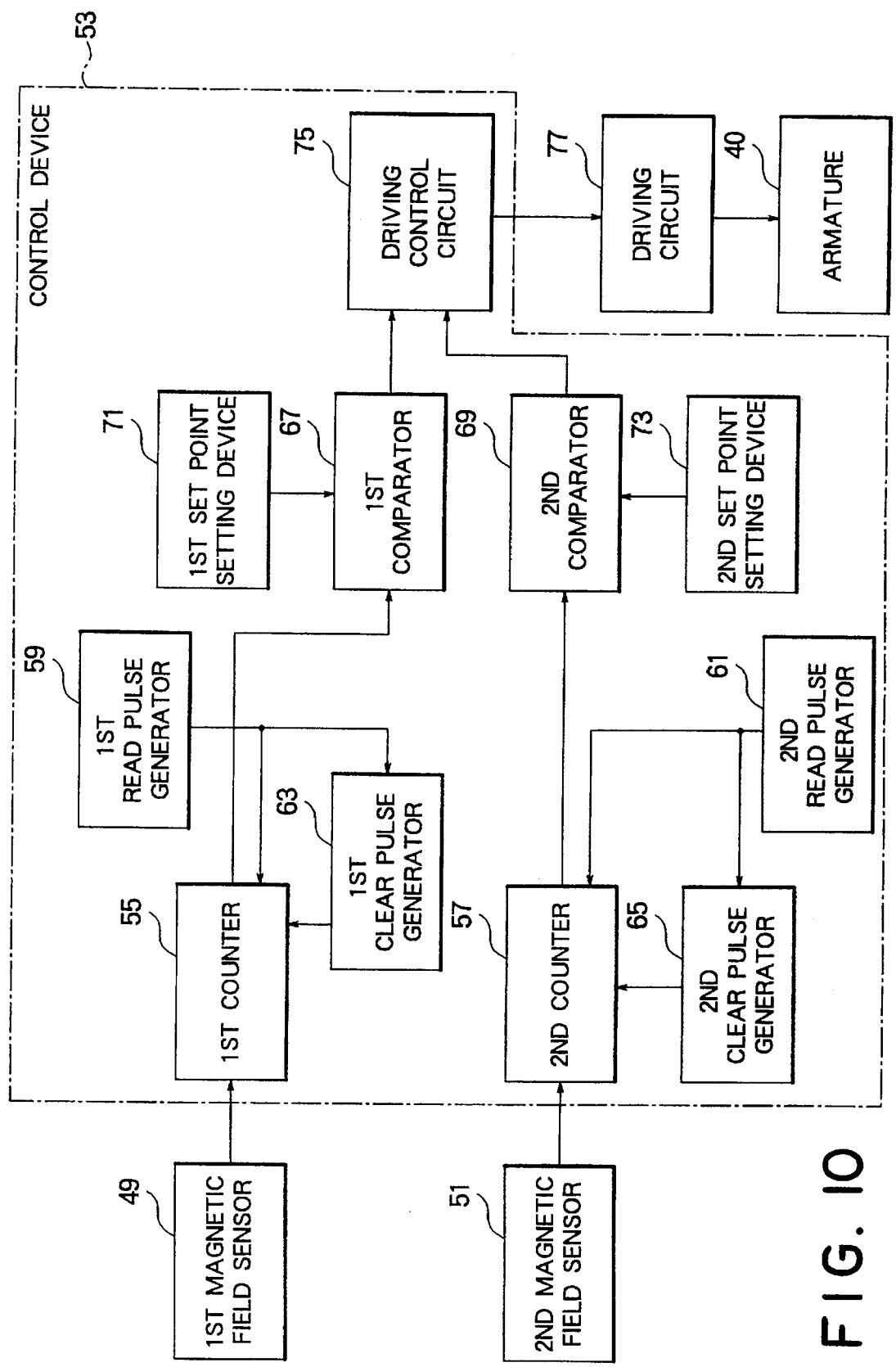
FIG. 10 is a block diagram of a control device according to the first and the second embodiments of the present invention.

FIG. 10 shows a block diagram of described is an operation of adjusting the rotation speed and the rotary phase of the motor using the magnet assembly and the magnetic field sensor assembly described in the first and the second embodiments.

In FIG. 10, a control device 53 is connected to the first and the second magnetic field sensors 49 and 51. The control device 53 comprises first and second counters 55 and 57, first and second read pulse generators 59 and 61, first and second clear pulse generators 63 and 65, first and second comparators 67 and 69, first and second set point setting devices 71 and 73, and a driving control circuit 75.

The first counter 55 is connected to the first magnetic field sensor 49. The first counter 55 is supplied with the first sensor signal from the first magnetic field sensor 49. The first sensor signal has a plurality of pulses. The first counter 55 counts the number of pulses of the first sensor signal to produce a first counted value and memorize the first counted value.

The first counter 55 is connected to the first comparator 67, the first read pulse generator 59, and the first clear pulse generator 63. The first read pulse generator 59 is connected to the first clear pulse generator 63. The first read pulse generator 59 generates a first read pulse at every first time interval. When the first counter 55 is supplied with the first read pulse from the first read pulse generator 59, the first counter 55 supplies the first counted value to the first comparator 67. The first clear pulse generator 63 generates a first clear pulse after the first clear pulse generator 63 is supplied with the first read pulse from the first read pulse generator 59. When the first counter 55 is supplied with the first clear pulse of the first clear pulse generator 63, the first counter 55 is cleared and reset.

The first comparator 67 is connected to the first set point setting device 71 and the driving control circuit 75. The first comparator 67 is supplied with a first set point from the first set point setting device 71. The first comparator 67 compares the first counted value with the first set point. When the first counted value is smaller than the first set point, the first comparator 67 sends a first small signal to the driving control circuit 75.

The second counter 57 is connected to the second magnetic field sensor 51. The second counter 57 is supplied with the second sensor signal from the second magnetic field sensor 51. The second sensor signal has a plurality of pulses. The second counter 57 counts the number of pulses of the second sensor signal to produce a second counted value and memorizes the second counted value.

The second counter 57 is connected to the second comparator 69, the second read pulse generator 61, and the second clear pulse generator 65. The second read pulse generator 61 is connected to the second clear pulse generator 65. The second read pulse generator 61 generates a second read pulse at every second time interval. When the second counter 57 is supplied with the second read pulses from the second read pulse generator 61, the second counter 57 supplies the second counted value to the second comparator 69. The second clear pulse generator 65 generates a second clear pulse after the second clear pulse generator 65 is supplied with the second read pulse from the second read pulse generator 61. When the second counter 57 is supplied with the second clear pulse of the second clear pulse generator 65, the second counter 57 is cleared and reset.

The second comparator 69 is connected to the second set point setting device 73 and the driving control circuit 75.

The second comparator 69 is supplied with a second set point from the second set point setting device 73. The second comparator 69 compares the second counted value with the second set point. When the second counted value is smaller than the second set point, the second comparator 69 sends a second small signal to the driving control circuit 75.

The driving control circuit 75 is supplied with the first and the second small signals from the first and the second comparators 67 and 69 and produces a driving control signal. The driving control circuit 75 is connected to a driving circuit 77 which is connected to the armature 40. The driving circuit 77 is supplied with the driving control signal from the driving control circuit 75 and produces a driving signal to send the driving signal to the armature 40.

In FIG. 10, the first and the second magnetic field sensors 49' and 51' may be connected to the control device 53 instead of the first and the second magnetic field sensors 49 and 51.

The present invention has thus been described in conjunction with the specific set of preferred embodiments. It should be understood, however, that the present invention is not limited to the particular embodiments shown and described above. Various changes and modifications may be made without departing from the spirit and scope of the appended claims. For example, the driving and sensed magnetized elements may be replaced by positive and negative electrodes, respectively, or vise versa, formed of a ferroelectric material rather than a ferromagnetic one. In such a case, north and south poles are replaced by positive and negative electrodes or vise versa. A sensor signal is thus obtained according to the change of the electrical field rather than the magnetic field.

In addition, the number of the first sensed magnetized elements 37 is not necessarily equal to the number of the driving magnetized elements. For example, two first sensed magnetized elements may be formed in a single driving magnetized elements. In such a case, the first sensed magnetized elements are positioned at two fifths and four fifths in width of the driving magnetized element. It is necessary that the magnetized segments are of the same width and that the distance between the adjacent first induced portions corresponds to that width. Under such conditions, there may be various combinations of the numbers of the driving magnetized elements and the first sensed magnetized elements.

What is claimed is:

1. A motor comprising:
   (a) a shaft rotatably supported by a supporting member;
   (b) a rotor member fixed to said shaft;
   (c) a magnet assembly comprising a plurality of driving magnetized elements which are circumferentially aligned with each other such that two adjacent ones of said driving magnetized elements have different poles from each other, said magnet assembly being fixed to said rotor member;
   (d) an armature having armature coils which are opposed to said magnet assembly and which are for use in generating induction magnetic fields to rotate said rotor member by interaction between the magnetic fields generated by said armature coils and said magnet assembly; and
   (e) magnetic field sensing means disposed between said armature coils and said magnet assembly;
   said magnet assembly further comprising:
   (1) a plurality of first sensed magnetized elements which are circumferentially aligned with each other such that two adjacent ones of the first sensed magnetized elements and the driving magnetized elements have different poles from each other; and
   (2) two second sensed said magnetic elements, the first sensed magnetized elements being of a different pole from respective corresponding driving magnetized elements, the second sensed magnetized elements being disposed on two adjacent ones of the driving magnetized elements, each of the second sensed magnetized elements being of a different pole from the corresponding driving magnetized element on which it is disposed and being radially displaced from the corresponding first sensed magnetic element, and
   said magnetic field sensing means comprising:
   (1) a first magnetic field sensor for sensing, as said rotor member rotates, the magnetic fields generated around the driving and first sensed magnetized elements; and
   (2) a second magnetic field sensor, for sensing, as said rotor member rotates, the magnetic fields generated around the driving and second sensed magnetized elements.

2. A motor as claimed in claim 1, wherein:
   the first magnetic field sensor comprises a conductive member to be passed across the magnetic field generated between the driving magnetized elements and the first sensed magnetized elements; and
   the second magnetized field sensor comprises a conductive member to be passed across the magnetic field generated between the driving magnetized elements and the second sensed magnetized elements.

3. A motor comprising:
   (a) a shaft;
   (b) a rotor member having a symmetric shape relative to said shaft, said rotor member being fixed to said shaft;
   (c) an annular magnet assembly fixed to said rotor member with said shaft passed through said magnet assembly at a center thereof, said magnet assembly including K driving magnetized elements, each of equal dimension, aligned at a perimeter of said magnet assembly about said shaft such that each has a pole opposite the pole of neighboring driving magnetized elements, where K is an even number larger than two; and
   (d) an armature having a plurality of armature coils which are opposed to the driving magnetized elements at a predetermined distance such that said armature reacts with the driving magnetized elements to cause said rotor member to rotate,
   said magnet assembly further comprising:
   (1) M first sensed magnetized elements provided in each of said driving magnetized elements such that said first sensed magnetized elements each have a pole opposite the pole of a corresponding driving magnetized element, where M is a natural number and each of said first sensed magnetized elements is 1/(2M+1) in length with respect to each of said driving magnetized elements in a circumferential direction of said magnet assembly; and
   (2) second sensed magnetized elements provided in two adjacent ones of said driving magnetized elements such that each has a pole opposite the pole of the corresponding driving magnetized element, said second sensed magnetized elements being radially displaced from the corresponding first sensed magnetized element, and said motor further comprising magnetic field sensing means disposed on a surface of said armature opposed to said magnet assembly for sensing alternating magnetic fields as said rotor member rotates.

4. A motor as claimed in claim 3, wherein:

said magnet assembly comprises:
(1) a magnetized segment zone extending along an outer periphery of said magnet assembly, the magnetized segment zone comprising said first sensed magnetized elements and a portion of the driving magnetized elements;
(2) an inner zone extending along an inner periphery of said magnet assembly which is radially inward from the magnetized segment zone, the inner zone comprising another portion of the driving magnetized elements; and
(3) an intermediate zone extending between the magnetized segment zone and the inner zone, the intermediate zone comprising said second sensed magnetized elements and the remaining portion of the driving magnetized elements, and said magnetic field sensing means comprises:
(1) a first magnetic field sensor for sensing magnetic fields generated at the magnetized segment zone; and
(2) a second magnetic field sensor for sensing magnetic fields generated at the intermediate and inner zones.

5. A motor as claimed in claim 4, wherein:

said first magnetic field sensor comprises a conductive member to be passed perpendicularly through magnetic fields generated at the magnetized segment zone; and said second magnetic field sensor comprises a conductive member to be passed perpendicularly through magnetic fields generated at the intermediate and inner zones.

6. A motor as claimed in claim 5, wherein said first magnetic field sensor has 2M first induced portions radially extended and equally separated in a circumferential direction from each other, and said first magnetic field sensor produces a first sensor signal comprising an electromotive force induced at the first induced portions when passing perpendicularly through the magnetic field generated at the magnetized segment zone.

7. A motor as claimed in claim 6, wherein said second magnetic field sensor includes:

a pair of second induced portions aligned at a position corresponding to the inner zone, the second induced portions being spaced from each other at a distance equal to a width of three driving magnetized elements in a circumferential direction; and a pair of third induced portions aligned at a position corresponding to the intermediate zone, the third induced portions being spaced from each other at a distance equal to a width of one driving magnetized element in the circumferential direction, said second magnetic field sensor producing as a second sensor signal electromotive forces induced at the second and third induced portions when passing perpendicularly through the magnetic fields generated at the inner and intermediate zones.

8. A motor as claimed in claim 4, wherein said first magnetic field sensor has 2M first induced portions radially extended and equally separated in a circumferential direction from each other, and said first magnetic field sensor produces a first sensor signal comprising an electromotive force induced at the first induced portions when passing perpendicularly through the magnetic field generated at the magnetized segment zone.

9. A motor as claimed in claim 8, wherein said second magnetic field sensor includes:

a pair of second induced portions aligned at a position corresponding to the inner zone, the second induced portions being spaced from each other at a distance equal to a width of three driving magnetized elements in a circumferential direction; and a pair of third induced portions aligned at a position corresponding to the intermediate zone, the third induced portions being spaced from each other at a distance equal to a width of one driving magnetized element in the circumferential direction, said second magnetic field sensor producing as a second sensor signal electromotive forces induced at the second and third induced portions when passing perpendicularly through the magnetic fields generated at the inner and intermediate zones.

10. A motor as claimed in claim 9, wherein the electromotive forces induced at the second and third induced portions are added to extract a waveform with a single enhanced peak by every rotation of said rotor member.

11. A motor as claimed in claim 8, wherein the first sensor signal has a sinusoidal waveform with a period of 20°.

12. A motor as claimed in claim 8, wherein the first sensor signal has a sinusoidal waveform with a period of 15°.

13. A combination of an annular magnet assembly and a magnetic field sensor assembly for use in measuring a rotation speed of a rotating member having a rotor member, the magnet assembly being fixed to the rotor member and said magnet assembly comprising:

K driving magnetized elements, each of equal dimension, aligned at a perimeter of said magnet assembly about said shaft such that each has a pole opposite the pole of the neighboring ones, where K is an even number larger than two,;

M first sensed magnetized elements provided in each of said driving magnetized elements such that said first sensed magnetized elements each have a pole opposite the pole of a corresponding driving magnetized element, where M is a natural number and each of said first sensed magnetized elements is 1/(2M+1) in length with respect to each of said driving magnetized elements in a circumferential direction of said magnet assembly; and second sensed magnetized elements provided in two adjacent ones of said driving magnetized elements such that each has a pole opposite the pole of the corresponding driving magnetized element, said second sensed magnetized elements being radially displaced from the corresponding first sensed magnetized element, said magnetic field sensor assembly being opposed to the magnet assembly for sensing alternating magnetic fields as the rotor member rotates.

14. A combination as claimed in claim 13, wherein:

the magnet assembly further comprises:
(1) a magnetized segment zone extending along the outer periphery of the magnet assembly, the magnetized segment zone comprising said first sensed magnetized elements and a portion of said driving magnetized elements;
(2) an inner zone extending along an inner periphery of the magnet assembly which is radially inward from the magnetized segment zone, the inner zone comprising another portion of said driving magnetized elements; and (3) an intermediate zone extending between the magnetized segment zone and the inner zone, the intermediate zone comprising said second sensed magnetized elements and the remaining portion of said driving magnetized elements, and the magnetic sensing means comprises:
(1) a first magnetic field for sensing magnetic fields generated at the magnetized segment zone; and
(2) a second magnetic field for sensing magnetic fields generated at the intermediate and inner zones.

15. A combination as claimed in claim 14, wherein:

said first magnetic field sensor comprises a conductive member to be passed through magnetic fields generated at the magnetized segment zone; and said second magnetic field sensor comprises a conductive member to be passed through magnetic fields generated at the intermediate and inner zones.

16. A combination as claimed in claim 15, wherein said first magnetic field sensor has 2M first induced portions radially extended and equally separated in a circumferential direction from each other, and said first magnetic field sensor produces a first sensor signal comprising an electromotive force induced at the first induced portions when passing through the magnetic fields generated at the magnetized segment zone.

17. A combination as claimed in claim 16, wherein said second magnetic field sensor includes:

a pair of second induced portions aligned at a position corresponding to the inner zone, the second induced portions being spaced from each other at a distance equal to a width of three driving magnetized elements in a circumferential direction; and a pair of third induced portions aligned at a position corresponding to the intermediate zone, the third induced portions being spaced from each other at a distance equal to a width of one driving magnetized element in the circumferential direction, said second magnetic field sensor producing as a second sensor signal electromotive forces induced at the second and third induced portions when passing perpendicularly through the magnetic fields generated at the inner and intermediate zones.

18. A combination as claimed in claim 14, wherein said first magnetic field sensor has 2M first induced portions radially extended and equally separated in a circumferential direction from each other, and said first magnetic field sensor produces a first sensor signal comprising an electromotive force induced at the first induced portions when passing through the magnetic fields generated at the magnetized segment zone.

19. A combination as claimed in claim 18, wherein said second magnetic field sensor includes:

a pair of second induced portions aligned at a position corresponding to the inner zone, the second induced portions being spaced from each other at a distance equal to a width of three driving magnetized elements in a circumferential direction; and a pair of third induced portions aligned at a position corresponding to the intermediate zone, the third induced portions being spaced from each other at a distance equal to a width of one driving magnetized element in the circumferential direction, said second magnetic field sensor producing as a second sensor signal electromotive forces induced at the second and third induced portions when passing perpendicularly through the magnetic fields generated at the inner and intermediate zones.

20. A combination as claimed in claim 19, wherein the electromotive forces induced at the second and third induced portions are added to extract a waveform with a single enhanced peak by every rotation of the rotor member.

21. A combination as claimed in claim 18, wherein the first sensor signal has a sinusoidal waveform with a period of 20°.

22. A combination as claimed in claim 18, wherein the first sensor signal has a sinusoidal waveform with a period of 15°.

* * * * *

UNITED STATES PATENT AND TRADEMARK OFFICE
CERTIFICATE OF CORRECTION

PATENT NO.   : 5,631,508
DATED        : May 20, 1997
INVENTOR(S)  : CHO et al.

It is certified that error appears in the above-identified patent and that said Letters Patent is hereby corrected as shown below:

Title page, Item [56] "U.S. PATENT DOCUMENTS", line 1, "Miller" should be --Muller--

Signed and Sealed this

Ninth Day of December, 1997

Attest:

BRUCE LEHMAN

*Attesting Officer*     Commissioner of Patents and Trademarks